United States Patent Office
3,467,672
Patented Sept. 16, 1969

3,467,672
2-LOWER ALKYL CARBAMOYLOXYIMINO-1,3-DITHIOLE
Roger Williams Addor, Pennington, N.J., assignor to American Cyanamid Company, Stamford, Conn., a corporation of Maine
No Drawing. Filed Jan. 29, 1968, Ser. No. 701,116
Int. Cl. C07d 71/00; A01n 9/12
U.S. Cl. 260—327        2 Claims

ABSTRACT OF THE DISCLOSURE

A dithiole compound of the formula:

$$R-NH\overset{O}{\overset{\|}{C}}-O-N=\!\!\!<\!\!\!\begin{array}{c}S\!-\!\!\!\\S\!-\!\!\!\end{array}\!\!\!\!|$$

wherein R is lower-alkyl. These compounds have insecticidal activity and are prepared by reacting a dialkali metal salt of dimercapto ethylene with a compound of the formula:

$$RNH-\overset{O}{\overset{\|}{C}}-O-N=C(X)_2$$

wherein R is lower-alkyl and X is halogen, said reaction being conducted in a liquid medium at a temperature between 0° C. and 100° C.

---

This invention relates to a new class of 1,3-dithiole carbamates and to a process for preparing the same. It relates further to the provision of compositions containing said new 1,3-dithiole carbamates and their use as insecticides.

The compounds according to this invention are represented by the following Formula I:

$$R-NH\overset{O}{\overset{\|}{C}}-O-N=\!\!\!<\!\!\!\begin{array}{c}S\!-\!\!\!\\S\!-\!\!\!\end{array}\!\!\!\!|$$

I wherein R is lower-alkyl.

The term "lower-alkyl" includes straight, branched and cyclic saturated hydrocarbon radicals having up to seven carbons, as exemplified by methyl, ethyl, n-propyl, n-butyl, sec.-butyl, amyl, sec.-amyl, n-hexyl, cyclohexyl and n-heptyl.

The compounds of this invention are prepared by reacting a lower-alkyl carbamoyl dihaloformaldehyde oxime represented by Formula II with an alkali metal salt of dimercapto ethylene represented by Formula III as depicted by the following equation:

$$RNH-\overset{O}{\overset{\|}{C}}-O-N=C(X)_2 + MSCH\!=\!CHSM \longrightarrow$$
II         III $$R-NH\overset{O}{\overset{\|}{C}}-O-N=\!\!\!<\!\!\!\begin{array}{c}S\!-\!\!\!\\S\!-\!\!\!\end{array}\!\!\!\!| + 2MX$$

I wherein R is as defined above, X is halogen such as chlorine or bromine and M is an alkali metal such as sodium, potassium or lithium.

In accordance with this invention, the reaction of the Formula II and Formula III compounds to produce the compounds of this invention is carried out with both reactants being in solution or, alternatively, with only the oxime compound being in solution and the dimercapto ethylene compound being in either partial or complete suspension. Exemplary suitable solvents are methanol, ethanol, acetone, ethylene glycol dimethyl ether, dimethylformamide, acetonitrile, benzene, or toluene or mixtures thereof. The reaction is carried out at a temperature ranging from about 0 to about 100° C., preferably ranging from about 0° C. to about 25° C. The reaction product can be recovered by filtration and then purified by crystallization.

The lower-alkyl carbamoyl dihaloformaldehyde oximes represented by Formula II are conveniently prepared by reacting about 1 mole of an oxime with at least 1 mole, and preferably up to about 50% mole excess, of an alkyl isocyanate. The reaction is carried out in the presence of a tertiary amine catalyst such as triethylamine, triethylenediamine, pyridine, or pentamethyl guanidine. The amine is usually employed in amounts ranging from about 1% to about 10% by weight based upon the weight of the oxime employed. The reaction is advantageously carried out in the presence of an organic solvent such as benzene, toluene or xylene. Exemplary suitable oxime reactants are phosgene oxime and dibromoformaldehyde oxime. Exemplary isocyanate reactants are methyl isocyanate, ethyl isocyanate and n-butyl isocyanate.

The compounds of Formula I have insecticidal activity and can be used to control a wide variety of insect pests such as bean aphid, southern armyworm, confused flour beetle and large milkweed bug. For use as an insecticide, the compounds of Formula I are incorporated in an effective amount, generally between about 10 and about 90 percent by weight of the composition, into an insecticidal formulation containing an insecticidally useful diluent. The diluent may be chosen so as to give a solid or liquid formulation. Suitable liquid diluents include organic solvents such as acetone, ethyl acetate, ethyl alcohol, benzene, kerosene, and the like. If desired, a non-solvent for the compounds of this invention can be employed to form a suspension of the active compound. When forming a suspension, it is desirable to employ a dispersing or surface active agent of the anionic or nonionic types. Suitable solid diluents include fuller's earth, bentonite, and the like. Solid diluents preferably in the form of wettable powders which may in themselves exert the insecticidal activity or inert powdered diluents may be used. Likewise, liquid formulations may be based upon insecticidally inert liquid diluents or a combination of such diluents with insecticidally active liquid material. The particular formulation which is chosen depends upon factors and conditions which are normally relied upon to determine the type of formulation and the concentration of active components.

The following examples are intended to illustrate the present invention and are not intended to limit the same.

EXAMPLE A

Preparation of O-methylcarbamoyl dichloroformaldehyde oxime $$CH_3NH-\overset{O}{\overset{\|}{C}}-O-N=CCl_2$$

To a stirred mixture of 48.5 parts of distilled phosgene oxime and 28.4 parts (by volume) of methyl isocyanate in 150 parts (by volume) of benzene is slowly added about 5 parts (by volume) of triethylamine until further addition produced no noticeable exotherm. After two hours, an additional 20 parts (by volume) of methyl isocyanate is added and the mixture stands overnight.

The resultant mixture is concentrated in vacuo and partitioned between 200 parts (by volume) of ether and 25 parts of water. The ether layer is washed with dilute hydrochloric acid, saturated sodium chloride, dried over magnesium sulfate, treated with activated charcoal, and concentrated in vacuo to yield 55.1 grams (76% based on phosgene oxime) of orange oil which crystallizes on seeding and cooling; melting point about 25° C. This material, combined with another 19.7 grams of crude product of similar quality in 200 milliliters of ether, is washed with 20 parts (by volume) of 5% potassium hydroxide solution (dark wash) and washing is completed as before. The dry ether solution is brought to the cloud point with 150 milliliters of petroleum ether, cooled to 0° C. and seeded. Further slow cooling to −55° C. yields light yellow crystals which are collected and washed with petroleum ether; 55.1 grams, melting point 31.5°–32.5° C.

Purification of O-methylcarbamoyl dichloroformaldehyde oxime is also achieved by passing crude product through a film molecular still at 40°–75°/.005 mm. Hg. Under these conditions, phosgene oxime methyl carbamate collects as a colorless solid on the condenser and is removed by subsequent replacement of cold with hot water. Unreacted phosgene oxime collects in the Dry Ice traps. A sample of this material crystallizes from 1:1 ether-petroleum ether as fine white crystals, melting point 32.8° C.–33.6° C.

EXAMPLE B

Preparation of O-ethylcarbamoyl dichloroformaldehyde oxime

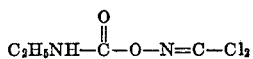

Employing the procedure of Example A, a mixture of equimolar amounts of distilled phosgene oxime and ethyl isocyanate in benzene is treated with triethylamine until no further exotherm is observed with the addition of small amounts of triethylamine. Some excess ethyl isocyanate is added to the reaction mixture and the mixture is permitted to stand at room temperature for several hours. The mixture is then concentrated under reduced pressure, partitioned between ether and water, the ether layer is separated from the water and washed with hydrochloric acid followed by saturated sodium chloride, then dried and concentrated under vacuum. O-ethylcarbamoyl dichloroformaldehyde oxime is recovered in good yield.

EXAMPLE 1

Preparation of 2-methylcarbamoyloxyimino-1,3-dithiole

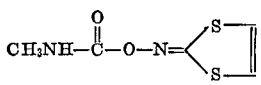

To 7.3 g. of the disodium salt of cis-1,2-dimercaptoethylene in 50 ml. of absolute ethanol (under nitrogen) was added 9.2 g. of O-methylcarbamoyl dichloroformaldehyde oxime in 50 ml. of absolute ethanol over 50 minutes. The reaction mixture was kept cold by an ice-bath during the addition period and for another hour. The mixture was filtered, treated with activated carbon, refiltered and concentrated in vacuo to leave 10.0 g. of orange oil which slowly crystallized on seeding. Recrystallization from ethanol-water with activated charcoal treatment gave 5.1 g. (50%) of off-white to yellow product, M.P. 100.6–102.0° C.

EXAMPLE 2

Preparation of 2-(ethylcarbamoyloxyimino)-1,3-dithiole

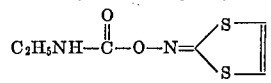

2-(ethylcarbamoyloxyimino)-1,3-dithiole is prepared using the identical procedure of Example 1 except that the O-methylcarbamoyl dichloroformaldehyde oxime is replaced by O-ethylcarbamoyl dichloroformaldehyde oxime.

EXAMPLE 3

Insecticidal activity

The compounds of this invention are tested for activity against common insect pests by the following procedures.

(1) Bean aphid (*Aphis fabae*).—Compounds are tested as 0.1%, .01%, and .001% solutions or suspension in 65% acetone-35% water. Two-inch fiber pots, each containing a nasturtium plant two inches high and infested with about 150 aphids two days earlier, are placed on a turntable (4 r.p.m.) and sprayed for two revolutions with a #154 DiVilbiss atomizer at 20 p.s.i. air pressure. The spray tip is held about six inches from the plants and the spray is directed so as to give complete coverage of the aphids and the plants. The sprayed plants are laid on their sides on white enamel trays which have had the edges coated with #50 SAE oil as a barrier. Mortality estimates are made after holding for two days at 70° F., and 50% R.H.

(2) Southern armyworm (*Prodenia eridania*).—The solutions from the aphid test are also used for this one. Sieva lima bean primary leaves are dipped for three seconds in the test solution and set in a hood on a screen to dry. When dry, each leaf is placed in a 4-inch petri dish which has a moist filter paper in the bottom and ten third-instar armyworm larvae about ⅜″ long. The dishes are covered and held at 80° F., and 60% R.H. After two days, mortality counts and estimates of the amount of feeding are made. Compounds showing partial kill and/or inhibition of feeding are held an extra day for further observations.

(3) Confused flour beetle (*Tribolium confusum*).— Compounds are formulated as 1% dusts by mixing 0.1 gram of the compound with 9.9 grams of Pyrax ABB talc, wetting with 5 ml. of acetone and grinding with a mortar and pestle until dry. 125 mg. of this 1% dust is then blown into the top of a dust settling tower with a short blast of air at 20 p.s.i. The dust is allowed to settle on four-inch petri dishes for two minutes, giving a deposit of approximately 87 mg./sq. foot (.094 mg./sq. cm.) of the 1% dust. The dishes are removed and 25 adult confused flour beetles are added immediately. The dishes are held for three days at 80° F. and 60% R.H., following which mortality counts are made.

(4) Large milkweed bug (*Oncopeltus fasiatus*).—The 1% dusts described above are used in this test. 25 mg. of the 1% dust is sprinkled evenly over the glass bottom of a seven-inch diameter cage, using a screen-bottom plastic cup about ⅝-inch in diameter as an applicator, giving a deposit of approximately 94 mg./sq. ft. (.108 mg./sq. cm.) of the 1% dust. Water is supplied in a two-ounce bottle with a cotton wick, twenty adult bugs are added and a screen cover placed on top. Mortality counts are made after holding for three days at 80° F. and 60% R.H. Test results, expressed as percent mortality, are shown in Table I.

TABLE I

| Compound | Aphids | | | Army Worms | | | Flour Beetle (1%) | Milkweed Bug (1%) |
| --- | --- | --- | --- | --- | --- | --- | --- | --- |
| | .1% | .01% | .001% | .1% | .01% | .001% | | |
| CH₃NH–C(O)–O–N=⟨S,S⟩ | 100 | 100 | 90 | 100 | 40 | 0 | 86 | 100 |

I claim:
1. A dithiole compound of the formula:
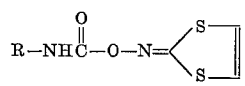
wherein R is lower-alkyl.
2. The compound of claim 1 wherein R is methyl.
References Cited
UNITED STATES PATENTS
3,364,230    1/1968    Addor _____ 260—327
JAMES A. PATTEN, Primary Examiner
U.S. Cl. X.R.
260—566; 424—277